US012136510B2

(12) United States Patent
Sugimoto et al.

(10) Patent No.: US 12,136,510 B2
(45) Date of Patent: Nov. 5, 2024

(54) COIL DEVICE

(71) Applicant: TDK CORPORATION, Tokyo (JP)

(72) Inventors: Satoshi Sugimoto, Tokyo (JP); Kyohei Tonoyama, Tokyo (JP); Miyuki Asai, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 216 days.

(21) Appl. No.: 17/230,332

(22) Filed: Apr. 14, 2021

(65) Prior Publication Data

US 2021/0319944 A1 Oct. 14, 2021

(30) Foreign Application Priority Data

Apr. 14, 2020 (JP) ................................ 2020-072410

(51) Int. Cl.
*H01F 27/255* (2006.01)
*H01F 27/28* (2006.01)
*H01F 27/32* (2006.01)
*H01F 41/02* (2006.01)

(52) U.S. Cl.
CPC ....... *H01F 27/255* (2013.01); *H01F 27/2823* (2013.01); *H01F 27/32* (2013.01); *H01F 41/0246* (2013.01)

(58) Field of Classification Search
CPC .. H01F 17/04; H01F 2017/048; H01F 27/255; H01F 27/2823; H01F 27/2828; H01F 27/292; H01F 27/32; H01F 41/0246
See application file for complete search history.

(56) References Cited

U.S. PATENT DOCUMENTS

| | | | | |
|---|---|---|---|---|
| 9,773,611 | B2 * | 9/2017 | Kim | H01F 41/12 |
| 2001/0016977 | A1 | 8/2001 | Moro et al. | |
| 2002/0067232 | A1 | 6/2002 | Oshima et al. | |
| 2015/0371752 | A1 * | 12/2015 | Park | H01F 27/255 336/200 |
| 2017/0004915 | A1 * | 1/2017 | Park | H01F 27/255 |
| 2020/0365315 | A1 * | 11/2020 | Kim | H01F 27/292 |

FOREIGN PATENT DOCUMENTS

| | | | |
|---|---|---|---|
| JP | 2001-267160 | A | 9/2001 |
| JP | 2002-083732 | A | 3/2002 |
| JP | 2003-272922 | A | 9/2003 |
| JP | 3181451 | U | 2/2013 |

* cited by examiner

*Primary Examiner* — Holly Rickman
*Assistant Examiner* — Linda N Chau
(74) *Attorney, Agent, or Firm* — Oliff PLC

(57) ABSTRACT

To provide a coil device capable of preventing a short circuit between turns of the coil part. A coil device 2 includes a core part 4 including a magnetic powder 41 and a resin 42, and a coil part 6 embedded in the core part 4 and having a wound wire **6*a* with an insulation coating layer 61**.

9 Claims, 7 Drawing Sheets

COIL DEVICE

TECHNICAL FIELD

The present invention relates to a coil device.

BACKGROUND

As a coil device embedding a coil part in an element body, the coil device disclosed in Patent Document 1 is known as an example. In the coil device of Patent Document 1, the coil part provided with an insulation coating film to the surface is embedded in a mold filled with a magnetic powder, and then compression molding is performed, thereby the coil device of Patent Document 1 is obtained.

However, for this type of the coil device, when a resin in the mold is compressed together with the magnetic powder while molding is performed, in some cases, at least part of the magnetic powder enters (sticks) in the insulation coating formed to the surface of the coil part. Therefore, it is necessary to make sure that a short circuit via the magnetic powder does not occur between turns of the coil part.

[Patent Document 1] JP Patent Application Laid Open No. 2001-267160

SUMMARY

The present invention is achieved in view of such circumstances, and the object is to provide a coil device capable of preventing a short circuit between turns of the coil part.

In order to achieve the above-mentioned object, the coil device according to the present invention includes an element body including a magnetic powder and a resin, and a coil part embedded in the element body and having a wound wire with an insulation coating layer, wherein a resin rich layer is formed around the coil part.

In the coil device according to the present invention, a resin rich layer is formed around the coil part. In the resin rich layer, an amount of the magnetic powder is relatively small (or an amount of the resin is relatively large), hence when the magnetic powder is compressed together with the resin in the mold, chances of the magnetic powder entering into the insulation coating layer of the wire can be reduced. Therefore, in the coil device according to the present invention, the magnetic powder does not enter (stick) in the insulation coating layer compared to a conventional coil device. Hence, a short circuit between the turns of the coil part is prevented, and a voltage resistance (ESD) of the coil device can be improved.

Preferably, at the surface of the insulation coating layer, a heat fusion layer is formed. By having such constitution, the heat fusion layer can function as the resin rich layer, and when the resin at the inside of the mold is compressed together with the magnetic powder, the magnetic powder can be prevented from entering to the insulation coating layer of the wire due to the heat fusion layer. Therefore, also in this case, a short circuit between the turns of the coil part can be prevented.

Preferably, the magnetic powder includes a first magnetic powder and a second magnetic powder having a particle size smaller than a particle size of the first magnetic powder; and the resin rich layer includes the first magnetic powder and the second magnetic powder. The first magnetic powder has a larger particle size than the particle size of the second magnetic powder, hence by including the first magnetic powder in the resin rich layer, an inductance property of the coil device as a whole is enhanced. Also, since the second magnetic powder has a smaller particle size than the particle size of the first magnetic powder, when the resin at the inside of the mold is compressed together with the magnetic powder, the second magnetic powder is less likely to enter into the insulation coating layer of the wire compared to the first magnetic powder. Therefore, by including the second magnetic powder in the resin rich layer, the magnetic powder can be effectively prevented from entering to the insulation coating layer of the above-mentioned wire.

Preferably, in the resin rich layer, an amount of the second magnetic powder is larger than an amount of the first magnetic powder at a position close to the coil part. In such case, the second magnetic powder enters to the inner side of a groove formed between the turns of the wire, or the second magnetic powder is placed between particles of the first magnetic powder. Hence, at the inside of the element body, an amount ratio (density) of the magnetic powder can be increased. Therefore, the coil device having a good inductance property can be obtained.

The magnetic powder included in the resin rich layer may be constituted by a soft magnetic metal. By having such constitution, a coil device having a good high frequency property can be obtained.

The resin rich layer may include the magnetic powder having a particle size larger than a thickness of the insulation coating layer. For example, when a material having a relatively low conductivity such as ferrite is used as the magnetic powder, even if the magnetic powder enters into the insulation coating layer of the wire, a short circuit rarely occurs between the turns of the coil part. Also, as the magnetic powder satisfies the particle size as mentioned in above, the coil device having a good inductance property can be obtained.

The magnetic powder included in the resin rich layer may be a metal magnetic powder, and the resin rich layer may include the metal magnetic powder having a particle size smaller than a thickness of the insulation coating layer. By using the metal magnetic powder as the magnetic powder, the coil device having a good inductance property can be obtained. Also, as the metal magnetic powder satisfies the particle size as mentioned in above, the magnetic powder can be effectively prevented from entering to the insulation coating layer of the above-mentioned wire.

The resin rich layer may be constituted (substantially) only by the resin. In this case, the magnetic powder is not included around the coil part, hence the magnetic powder can be effectively prevented from entering into the insulation coating layer of the above-mentioned wire.

The wire may be constituted by a rectangular wire. By constituting as such, a space factor of the coil part can be increased in the element body, and the coil device having a good inductance property can be obtained. Also, a low resistance of the coil part can be achieved.

DETAILED DESCRIPTION

Hereinbelow, the present invention is described based on embodiments shown in the figures.

First Embodiment

Figure 1:
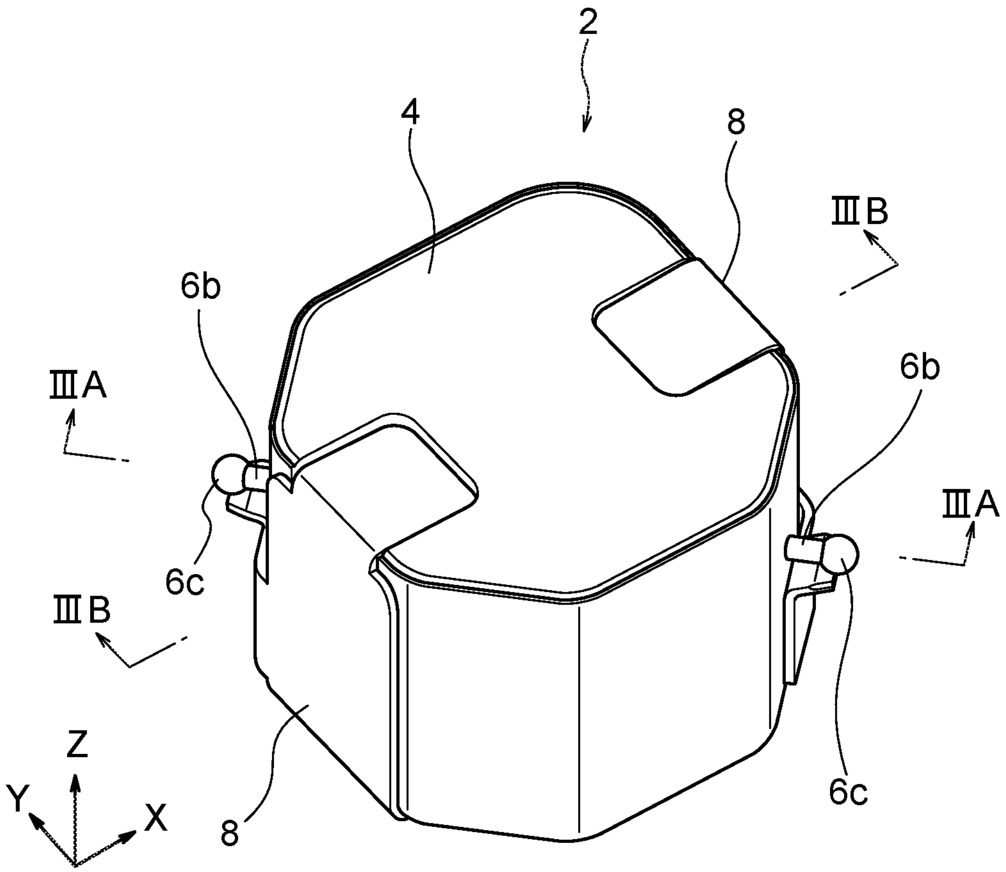
FIG. 1 is a perspective view of a coil device according to a first embodiment of the present invention.

As shown in FIG. 1, a coil device 2 according to the first embodiment of the present invention includes; a core part (element body) 4 as a compression molded article including a magnetic powder and a resin; a coil part 6 formed by winding a wire 6*a* with an insulation coating layer (insulation coating film) (see FIG. 3A); and a terminal electrode 8 which connects to a lead part 6*b* of the wire 6*a* via a bonding part 6*c*. The coil device 2 is used as a power transformer, a power inductor, a noise filter inductor, and the like for electronic components, electric devices, automobile devices, and so on.

In the present embodiment, in the figures, a coil axis direction of the coil part 6 is defined as Z axis; and X axis and Y axis are respectively perpendicular to Z axis. In the present embodiment, X axis matches with the direction of which a pair of terminal electrodes are facing against each other, however it is not limited thereto.

A size of the coil device 2 is not particularly limited, and for example a width in X axis direction may be 1.0 to 20 mm, and a width in Y axis direction may be 1.0 to 20 mm, and a height may be 1.0 to 10 mm.

Figure 2:
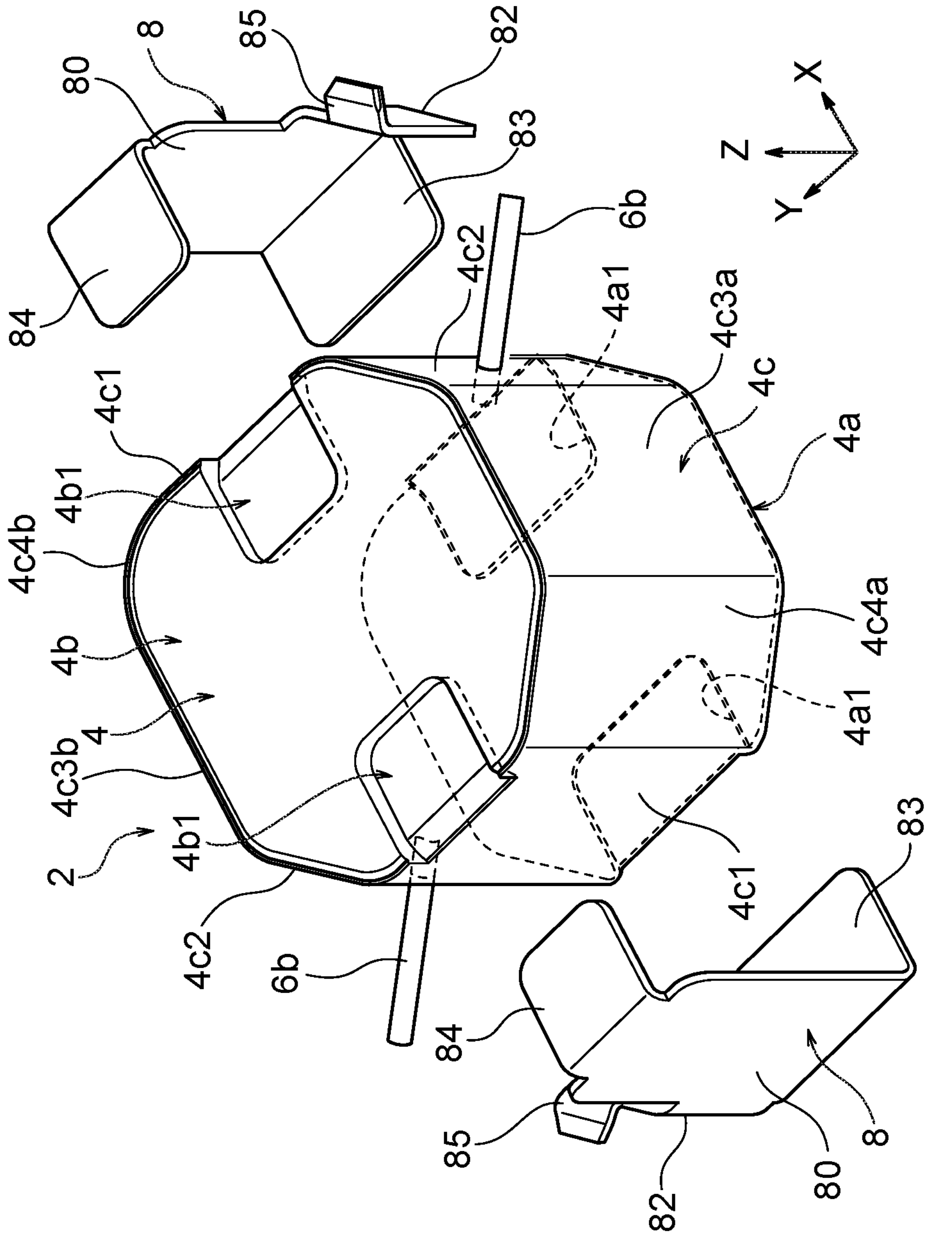
FIG. 2 is an exploded perspective view of the coil device shown in FIG. 1.

As shown in FIG. 2, the core part 4 is formed with a mounting side outer face 4*a* at a lower part in Z axis direction, and also a non-mounting side outer face 4*b* is formed at an upper part in Z axis direction. A side face 4*c* which is an outer side face is formed between the mounting side outer face 4*a* and the non-mounting side outer face 4*b*.

In the present embodiment, the side face 4*c* is constituted by a combination of plurality of flat faces and curved faces, however it is not limited to this, and the entire side face 4*c* may be constituted by a curved face, or the side face may be a polygonal shape as a whole. In the present embodiment, when the core part 4 is viewed from the upper part or the lower part along Z axis direction, the core part 4 preferably has a non-symmetric shape. This is because the shape and the direction of the coil device can be easily recognized when the core part 4 is viewed from the upper part or the lower part of Z axis direction.

The side face 4*c* of the core part 4 has a pair of main installing side faces 4*cl* positioned opposite against each other in X axis direction. In the present embodiment, the main installing side faces 4*cl* are flat shaped in accordance with a shape of a main terminal body 80 of the terminal electrode 8, however when an inner face of the main terminal body 80 has a curved shape, then the main installing side face 4*cl* may also be a curved shape. Also, the side face 4*c* of the core part 4 has a sub installing side face 4*c*2 next to the main installing side face 4*cl* in clockwise direction when the core part 4 is viewed from the top in Z axis direction. The lead part 6*b* extends out from the sub installing side face 4*c*2.

Further, the side face 4*c* of the core part 4 has non-installing side faces 4*c*3*a*, 4*c*4*a*, or 4*c*3*b*, and 4*c*4*b* next to the sub installing side face 4*c*2 in clockwise direction when the core part 4 is viewed from the top in Z axis direction. In the present embodiment, the side faces 4*cl* and 4*cl* positioned opposite to each other have same shapes and same areas, and the same applies to the side faces 4*c*2 and 4*c*2.

The non-installing side faces 4*c*3*a* and 4*c*3*b* positioned opposite to each other have different width in X axis direction. Also, regarding the non-installing side faces 4*c*4*a* and 4*c*4*b* positioned opposite to each other, one has a flat face and the other has a curved face, and the non-installing side faces 4*c*4*a* and 4*c*4*b* have different shapes with respect to each other. That is, the non-installing side faces 4*c*3*a* and 4*c*3*b* (4*c*4*a* and 4*c*4*b*) positioned opposite to each other have different shapes and sizes in the present embodiment. By constituting as such, when the core part 4 is viewed from the top or the bottom of Z axis direction of the core part 4, a non-symmetric shape can be formed.

The terminal electrode 8 has the main terminal body 80. The main terminal body 80 has a flat square shape in accordance with the shape of the main installing side face 4*cl* of the core part 4, however as mentioned in above, when the shape of the main installing side face 4*cl* is changed, the shape of the main terminal body 80 can be also changed.

Figure 3A:
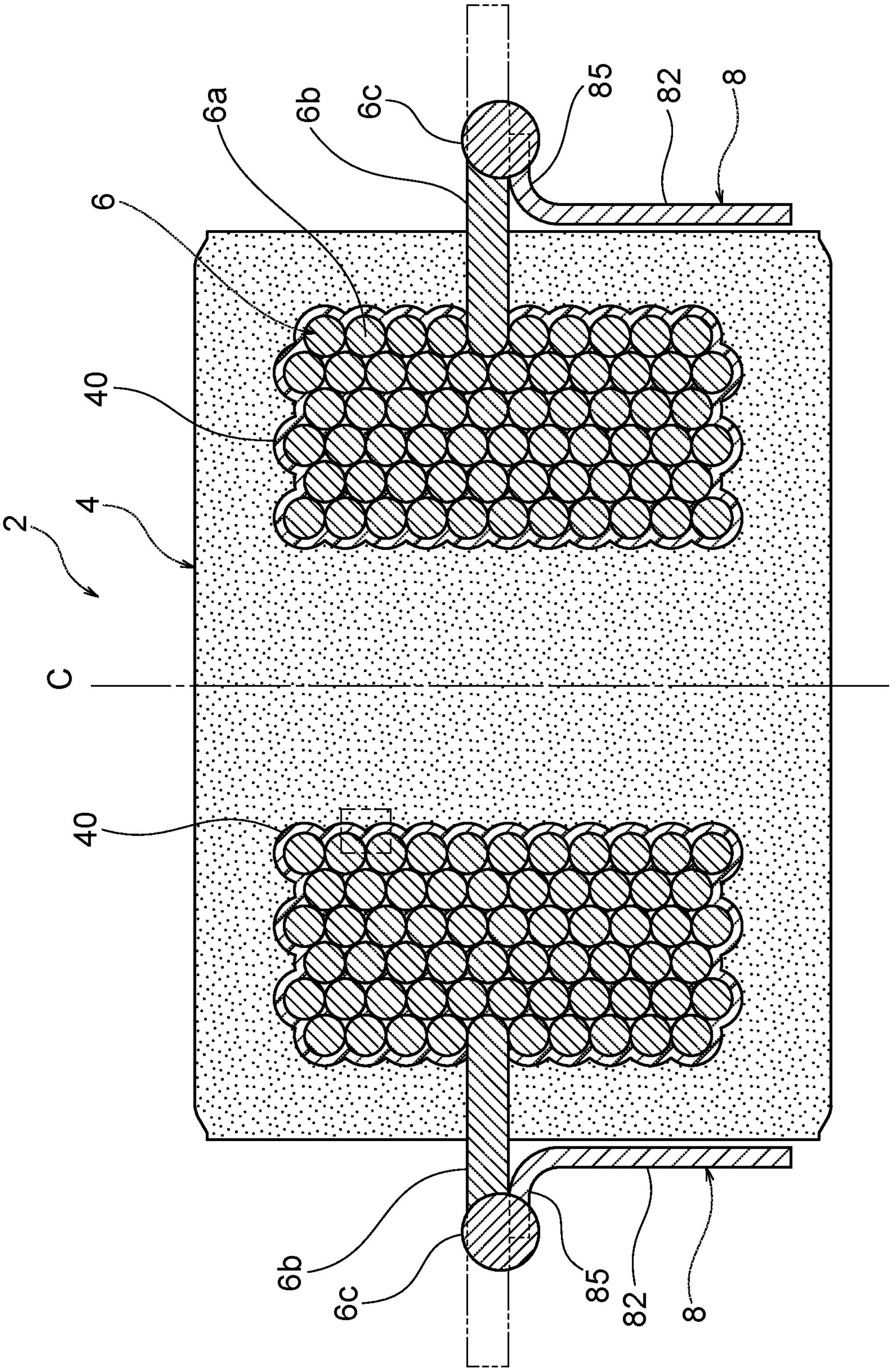
FIG. 3A is a cross section of the coil device shown in FIG. 1 along IIIA-IIIA line.
Figure 3B:
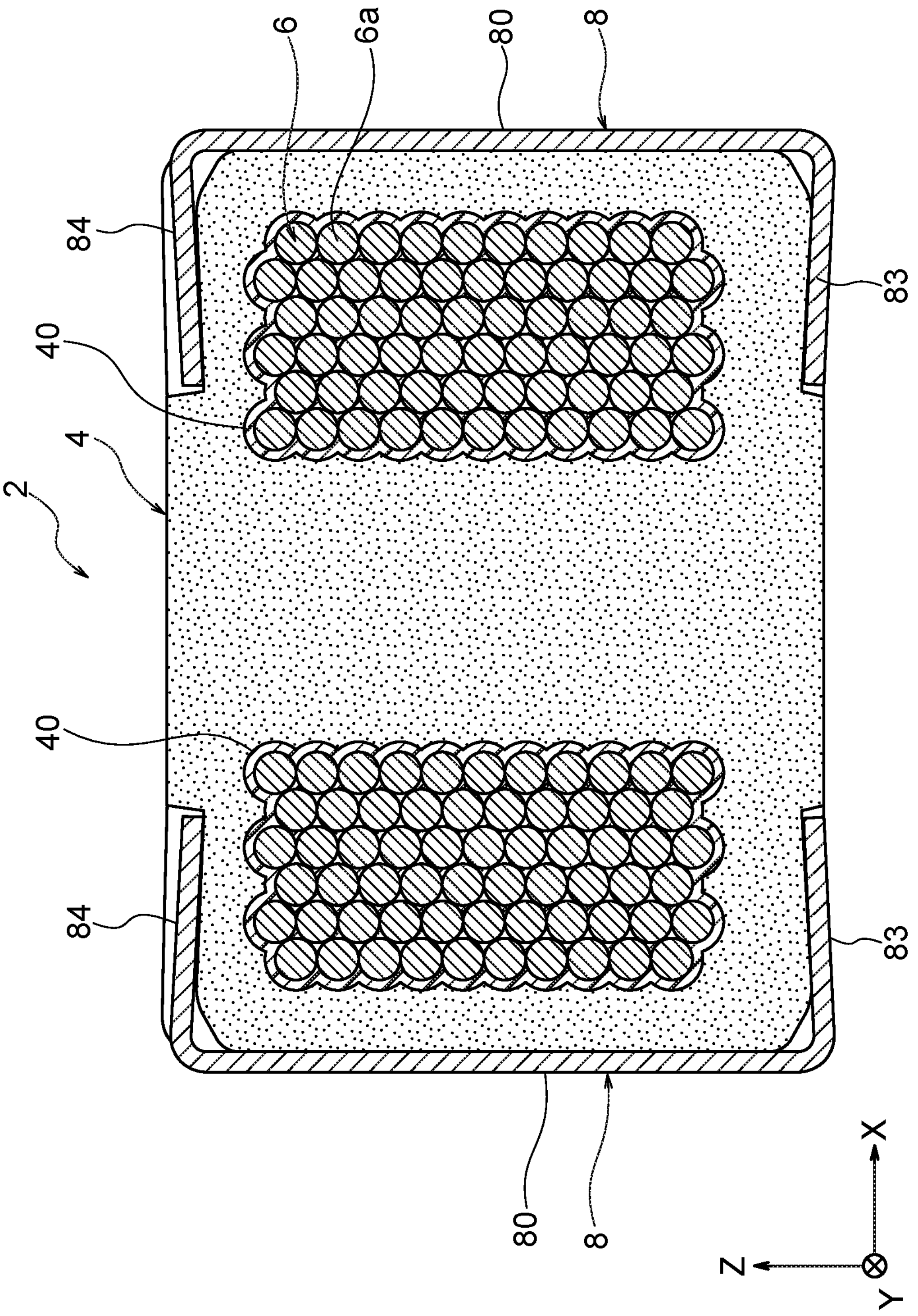
FIG. 3B is a cross section of the coil device shown in FIG. 1 along IIIB-IIIB line.

As shown in FIG. 3B, at the lower part in Z axis direction of the main terminal body 80, a lower resilient piece 83 is integrally formed to the lower part of the main terminal body 80 by bending the terminal electrode 8. Also, at the upper part in Z axis direction of the main terminal body 80, an upper resilient piece 84 is integrally formed to the upper part of the main terminal body 80 by bending the terminal electrode 8. As shown in FIG. 2, the lower resilient piece 83 is formed so that it fits with a lower installing groove 4*al* formed to the mounting side outer face 4*a* which is a bottom face of the core part 4.

The bottom part of the lower installing groove 4*al* is tilted upwards in Z axis direction towards a center axis of the coil part 6, and it is made so that the lower resilient piece 83 and the lower installing groove 4*al* do not easily come off once these are fitted with each other. The upper resilient piece 84 is made to fit with the upper installing groove 4*b*1 formed to the non-mounting side outer face 4*b* which is the upper face of the core part 4. The bottom part of the upper installing groove 4*b*1 is tilted downwards in Z axis direction towards the center axis of the coil part 6, and it is made so that the upper resilient face 84 and the upper installing groove 4*b*1 do not come off easily once these are fitted with each other.

As shown in FIG. 2, a sub terminal body 82 is integrally formed to the main terminal body 80. The sub terminal body 82 is bent from the main terminal body 80 in a predetermined angle with respect to a plane of the main terminal body 80. The above-mentioned angle roughly matches with a crossing angle between the main installing side face 4*cl* and the sub installing side face 4*c*2.

The sub terminal body 82 has an inner shape which corresponds with an outer shape of the sub installing side face 4*c*2. In the present embodiment, the sub terminal body 82 has a flat plate shape, however it may be a curved shape depending on the outer shape of the sub installing side face 4*c*2. Also, as shown in FIG. 3A, the sub terminal body 82 faces against the sub installing side face 4*c*2, and these do not necessarily have to be in contact with each other.

As shown in FIG. 2, at the upper part in Z axis direction of the sub terminal body 82, the lead supporting part 85 is integrally formed to the sub terminal body 82 by bending the terminal electrode 8 towards outside. Note that, the outside of the terminal electrode 8 is a direction away from the core part 4, and the inside of the terminal electrode is a direction towards the core part 4.

As shown in FIG. 3A and FIG. 3B, the coil part 6 is a part where the wire 6*a* is wound in a coil form, and a pair of lead parts 6*b*, which are both ends of the wire 6*a*, is pulled out from the coil part 6 to outside of the core part 4. In the embodiment shown in the figure, from the coil part 6, the pair of lead parts 6*b* is pulled outside from the sub installing side face 4*c*2 of the core part 4 in a perpendicular direction to the side face.

The wire 6*a* is for example constituted from a lead wire 60, and an insulation coating layer 61 which is coating an outer surface of the lead wire 60. The lead wire 60 is for example constituted from Cu, Al, Fe, Ag, Au, phosphor bronze, and the like. The insulation coating layer 61 is for example constituted by polyurethane, polyamideimide, polyimide, polyester, polyester-imide, polyester-nylon, and the like. In the present embodiment, the bilateral cross section shape of the wire 6*a* is a circular shape. Note that, as mentioned in below, the insulation coating layer 61 is constituted by two layers (a first insulation coating layer 610 and a second insulation coating layer 620).

A thickness of the insulation coating layer 61 is preferably 100 to 300 μm, and more preferably 200 to 300 μm.

The core part 4 is made of a composite material including a magnetic powder and a resin, and the core part 4 is formed by carrying out compression molding or injection molding to granules including the magnetic powder and the resin (binder resin). The magnetic powder is not particularly limited, and metal magnetic powder (soft magnetic powder) such as Sendust (Fe—Si—Al; iron-silicon-aluminum), Fe—Si—Cr (iron-silicon-chromium), Permalloy (Fe—Ni), carbonyl iron based, carbonyl Ni based, amorphous powder, nanocrystal powder, and the like may be preferably used.

A particle size of the magnetic powder is preferably 0.5 to 50 μm. In the present embodiment, the magnetic powder is a metal magnetic powder, and an outer circumference of the particle is preferably insulation coated. As for insulation coating, a metal oxide coating, a resin coating, a chemical coating such as phosphorous and zinc, and the like may be mentioned.

Note that, as the magnetic powder, a ferrite magnetic powder such as Mn—Zn, Ni—Cu—Zn, and the like may be mentioned. The binder resin is not particularly limited, and for example an epoxy resin, a phenol resin, an acrylic resin, a polyester resin, polyimide, polyamideimide, a silicon resin, a combination of these may be mentioned.

In the present embodiment, the core part 4 positioned around the coil part 6 is carried out with an insulation treatment, and the resin rich layer 40 is formed around the coil part 6. The resin rich layer 40 is part of the core part 4, and includes both the magnetic powder and the resin.

Figure 4:
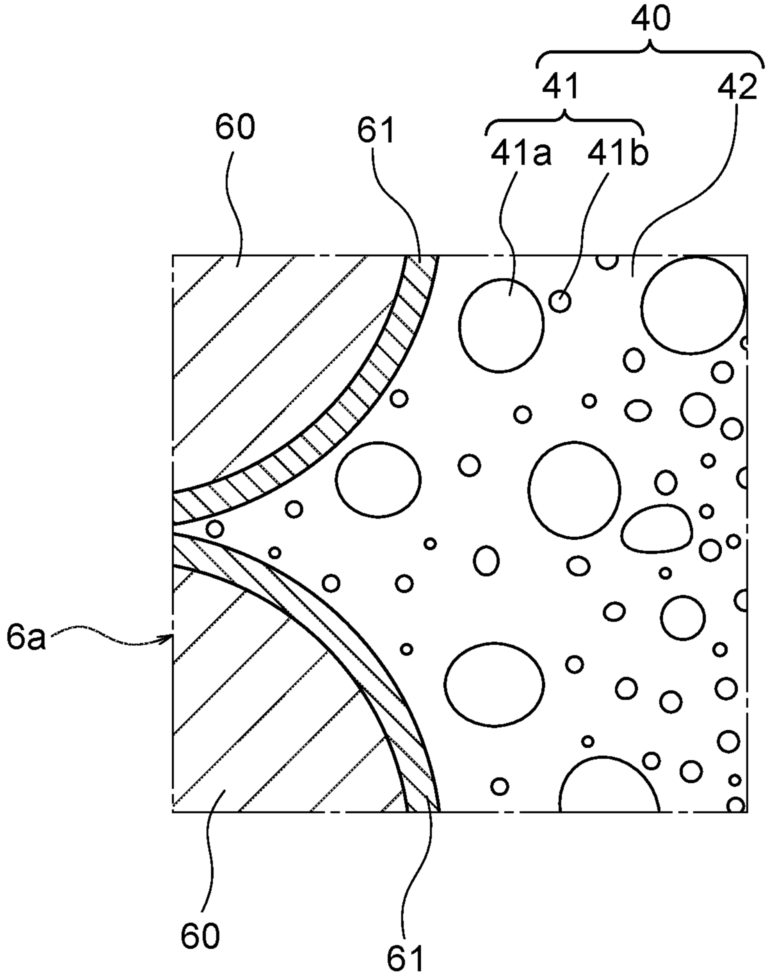
FIG. 4 is a partial enlarged figure of an area surrounded by a dotted line of FIG. 3A.

Hereinbelow, as shown in FIG. 4, the magnetic powder included in the core part 4 is referred as "a magnetic powder 41", and the resin included in the core part 4 is referred as "a resin 42". In the present embodiment, the resin rich layer 40 includes the magnetic powder 41 and the resin 42. The magnetic powder 41 and the resin 42 are included in the resin rich layer 40; and the magnetic powder 41 and the resin 42 included in parts other than the resin rich layer 40 may be same or different kinds. For example, the magnetic powder 41 included in the resin rich layer 40 may be ferrite and the like, and the magnetic powder 41 included in parts other than the resin rich layer 40 may be a metal magnetic powder and the like.

In the present embodiment, an amount of the magnetic powder 41 and an amount of the resin 42 have difference (gradient) in the core part 4, and the resin rich layer 40 has more resin component so that the resin rich layer 40 is resin rich. Note that, the amount of the magnetic powder 41 and the amount of the resin 42 in the resin rich layer 40 can be determined by a simplified quantitative analysis using cross section EDS. In this case, the resin rich layer 40 has a smaller weight ratio (or, a ratio in terms of number of atoms) of the metal elements (such as Fe) which constitute the magnetic powder 41 compared to other parts (for example, a center part of the core part 4) than the resin rich layer 40, and has a larger weight ratio (or, a ratio in terms of number of atoms) of elements constituting the resin 42 (such as C).

The magnetic powder 41 included in the resin rich layer 40 is preferably constituted by a soft magnetic metal. In such case, the coil device 2 having a good high frequency property can be obtained.

In the present embodiment, the resin rich layer 40 is constituted by both the magnetic powder 41 and the resin 42, however the constitution of the resin rich layer 40 is not limited thereto, and it may be constituted only by the resin 42. Alternatively, the resin rich layer 40 may be constituted by having a significantly larger amount of the resin 42 compare to the amount of the magnetic powder 41 (the resin rich layer 40 may substantially constituted only by the resin). Note that, the wire 6*a* constituting the coil part 6 is formed with the insulation coating layer 61 which is constituted only by the resin, however the resin rich layer 40 and the insulation coating layer 61 are constituted separately.

In the resin rich layer 40, for example, the amount of the resin 42 is larger compared to a center part of the core part 4 (area around the coil axis C of the coil part 6 shown in FIG. 3A). Alternatively, in the resin rich layer 40, the amount of the magnetic powder 41 is smaller compared to the center part of the core part 4 (area around the coil axis C of the coil part 6 shown in FIG. 3A). Note that, the amount of the resin 42 (or, the magnetic powder 41) in the resin rich layer 40 may be larger (or smaller) compared to parts other than the center part of the core part 4.

As shown in FIG. 3A and FIG. 3B, the resin rich layer 40 has a predetermined thickness, and it is formed so to surround the area (outer circumference face) around the coil part 6. More specifically, the resin rich layer 40 is formed along the shape of the outer circumference of the coil part 6, and has a predetermined thickness on the outer surface of the insulation coating layer 61 of the wire 6*a* (see FIG. 4). The resin rich layer 40 has a function to prevent the magnetic powder 41 (particularly the first magnetic powder 41*a*) from entering (stick) to the insulation coating layer 61.

The shape of the resin rich layer 40 is not limited to the examples shown in the figures, and for example the resin rich layer 40 may be formed to a position spaced apart from the coil part 6 in addition to the area around the coil part 6. For example, part of the resin rich layer 40 may be formed to an area around the lead part 6*b* of the wire 6*a*. Alternatively, the resin rich layer 40 may be partially formed to a limited area around the coil part 6. For example, the resin rich layer 40 may be selectively formed to the position where a high pressure is applied when the resin is compressed with the magnetic powder in the mold during molding.

The thickness of the resin rich layer 40 is preferably 5 to 200 μm, more preferably 50 to 150 μm, and particularly preferably 80 to 120 μm. Also, the thickness of the resin rich layer 40 is thicker than the thickness of the insulation coating layer 61 formed to the surface of the lead wire 60.

The thickness of the resin rich layer 40 can be obtained based on SEM image of the cross section of the core part 4.

As shown in FIG. 4, the magnetic powder 41 includes the first magnetic powder (large particle or coarse powder) 41*a* and the second magnetic powder (small particle or fine powder) 41*b* having a smaller particle size than the particle size of the first magnetic powder 41*a*. The first magnetic powder 41*a* is included in the core part 4 mainly to increase an inductance of the core part 4; and the second magnetic powder 41*b* is included in the core part 4 mainly to increase a filling density of the magnetic powder 41 in the core part 4. The first magnetic powder 41*a* and the second magnetic powder 41*b* may have same composition or different compositions.

The resin rich layer 40 includes the first magnetic powder 41*a* and the second magnetic powder 41*b*. The resin rich layer 40 may include the first magnetic powder 41*a* having a particle size for example of 20 to 50 μm, and the second magnetic powder 41*b* having a particle size for example of 5 to 10 μm.

Note that, the first magnetic powder 41*a* and the second magnetic powder 41*b* are also included in areas other than the resin rich layer 40 (such as the center part of the core part 4 and the like) among the core part 4. The particle size of the first magnetic powder 41*a* and the particle size of the second magnetic powder 41*b* included in such areas may be same or different as the particle size of the first magnetic powder 41*a* and the particle size of the second magnetic powder 41*b* included in the resin rich layer 40.

The second magnetic powder 41*b* is positioned between particles each constituting the first magnetic powder 41*a* (in other words, the second magnetic powder 41*b* fills the space between the particles each constituting the first magnetic powder 41*a*). In the resin rich layer 40, the amount of the second magnetic powder 41*b* is larger than the amount of the first magnetic powder 41*a* at a position close to the coil part 6. That is, in the resin rich layer 40, the amount of the second magnetic powder 41*b* increases at a position closer to the coil part 6; and the amount of the first magnetic powder 41*a* increases at a position away from the core part 6. Note that, a distribution of the amount of the first magnetic powder 41 and the amount of the resin 42 in the resin rich layer 40 is not limited thereto, and it may be uniform across the resin rich layer 40.

At the V-shaped groove formed between the adjacent turns of the wire 6*a*, the second magnetic powder 41*b* is embedded (filled). On the other hand, the first magnetic powder 41*a* is not embedded in the groove, and preferably it is placed at a position relatively away from the coil part 6.

The resin rich layer 40 includes the magnetic powder 41 (the first magnetic powder 41*a*) having a particle size larger than the thickness of the insulation coating layer 61 formed to the surface of the lead wire 60. As such, in case of providing the first magnetic powder 41*a* having a particle size larger than the thickness of the insulation coating layer 61 to the resin rich layer 40, a material of the magnetic powder 41 preferably has a low conductivity (for example, Ni—Zn based ferrite). In this case, the material constituting the second magnetic power 41*b* may be a material having a low conductivity as similar to the first magnetic powder 41*a*. Alternatively, when the particle size of the second magnetic powder 41*b* is smaller than the thickness of the insulation coating layer 61, the material constituting the second magnetic powder 41*b* may have a high conductivity.

Next, a method of producing the coil device 2 shown in FIG. 1 is described. First, as shown in FIG. 3A and FIG. 3B, the coil part 6 having the wire 6*a* wound in a coil form is prepared. The coil part 6 is constituted for example by an air core coil and the like. For the wire 6*a*, the wire formed with the insulation coating layer 61 to the surface of the lead wire 60 is used.

Next, the coil part 6 is immersed in a resin liquid to adhere the resin to the surface of the coil part 6. As the resin liquid, the resin 42 constituting the resin rich layer 40 is used (see FIG. 4). Here, by appropriately regulating the length of time for immersing the coil part 6 in the resin liquid or so, a resin layer having a thickness of 5 to 200 μm can be formed to the surface of the coil part 6.

Next, after the resin layer formed to the surface of the coil part 6 has been cured, the entire body including the inner side of the coil part 6 is covered by the core part 4 (element body), then the lead part 6*b* of the wire 6*a* constituting the coil part 6 is exposed from the outer face of the core part 4. The core part 4 is molded for example by filling a mixture including the magnetic powder and the binder resin into a cavity of a mold while the coil part 6 is inserted in the cavity of the mold, then compression (heat pressured) is carried out to the entire body. As the magnetic powder, the magnetic powder 41 constituting the resin rich layer 40 is used (see FIG. 4). Also, as the magnetic powder 41, the magnetic powder including the first magnetic powder 41*a* and the second magnetic powder 41*b* is used. As a method of compression molding, a metal mold may be used, and also hydraulic pressure, water pressure, and the like may be used.

When the resin is compressed together with the magnetic powder in the mold, part of the magnetic powder in the mold enters into the resin layer formed to the surface of the coil part 6, and the resin layer including the magnetic powder is formed to the surface of the coil part 6. As mentioned in above, the magnetic powder is constituted by the magnetic powder 41 constituting the resin rich layer 40, and the resin layer is constituted by the resin 42 constituting the resin rich layer 40. Hence, as the magnetic powder in the mold enters into the resin layer formed to the surface of the coil part 6, the resin rich layer 40 including the magnetic powder 41 and the resin 42 is obtained.

By regulating the pressure of compression molding, an amount of the magnetic powder entering into the resin layer formed to the surface of the coil part 6 can be regulated, and a desired amount of the magnetic powder 41 in the resin rich layer 40 can be obtained. After molding is done, the lead part 6*b* is taken out together with the molded article. The outer surface of the core part 4 may be performed with glass coating, insulation resin coating, and the like.

The terminal electrode 8 shown in FIG. 2 is prepared at the same time of, before, or after the core part 4 is molded. The terminal electrode 8 is preferably constituted by a metal (including alloy) such as Cu, phosphor bronze, or so. The terminal electrode 8 can be obtained by press molding a single metal plate having a uniform thickness or a composite metal plate such as clad metal and the like, then these are cut out, and bent, thereby the terminal electrode 8 can be produced. A surface of the terminal electrode 8 may be formed with a plating film and the like to improve an adhesiveness with a solder. The lower resilient piece 83 and the upper resilient piece 84 may be formed to the terminal electrode 8 if needed.

Then, the bonding part 6*c* to bond with the lead part 6*b* is formed to a tip of the lead supporting part 85. The lead part 6*b* and the tip of the lead supporting part 85 are bonded for example by laser soldering at the bonding part 6*c*. Note that, as a method for forming the bonding part 6*c*, not only laser soldering, but also arc soldering, ultrasonic soldering, heat compression bonding, solder bonding, and the like may be mentioned.

Before forming the bonding part 6*c*, the resin coating of the lead part 6*b* is preferably removed. Further preferably, the resin coating of the lead part 6*b* is removed before the terminal electrode 8 is installed to the outer face of the core part 4. As discussed in above, the coil device 2 shown in FIG. 1 can be obtained.

The coil device 2 according to the present embodiment is formed with the resin rich layer 4 around the coil part 6. The amount of the magnetic powder 41 is relatively small in the resin rich layer 40 (or, the amount of the resin 42 is relatively large), hence when the resin in the mold is compressed together with the magnetic powder 41, chances of the magnetic powder 41 entering into the insulation coating layer 61 of the wire 6*a* can be reduced. Therefore, in the coil device 2 according to the present embodiment, the magnetic powder 41 scarcely enters (sticks) into the insulation coating layer 61 of the wire 6*a* compared to the conventional coil device. Thus, a short circuit between the turns of the coil part 6 is prevented, and a withstand voltage (ESD) of the coil device 2 can be improved.

Also, in the present embodiment, the magnetic powder 41 includes the first magnetic powder 41*a* and the second magnetic powder 41*b* having a smaller particle size than the particle size of the first magnetic powder 41*a*; and the resin rich layer 40 includes the first magnetic powder 41*a* and the second magnetic powder 41*b*. The first magnetic powder 41*a* has a larger particle size than the particle size of the second magnetic powder 41*b*, hence by including the first magnetic powder 41*a* in the resin rich layer 40, the inductance property of the coil device 2 as a whole is enhanced. Also, the second magnetic powder 41*b* has a smaller particle size than the particle size of the first magnetic powder 41*a*, hence when the magnetic powder 41 is compressed together with the resin in the mold, it scarcely enters into the insulation coating layer 61 of the wire 6*a* compared to the first magnetic powder 41*a*. Therefore, by including the second magnetic powder 41*b* in the resin rich layer 40, the magnetic powder 41 can be effectively prevented from entering into the insulation coating layer 61 of the above-mentioned wire 6*a*.

Also, in the present embodiment, the amount of the second magnetic powder 41*b* is larger than the amount of the first magnetic powder 41*a* at the position close to the coil part 6 in the resin rich layer 40. In such case, the second magnetic powder 41*b* enters to the inner side of the groove formed between the turns of the wire 6*a*. Also, the second magnetic powder 41*b* is positioned between the particles each constituting the first magnetic powder 41*a*. Thus, an amount ratio (density) of the magnetic powder 41 in the core part 4 (element body) can be increased. Therefore, the coil device 2 having a good inductance property can be obtained.

Also, in the present embodiment, the resin rich layer 40 includes the magnetic powder 41 (the first magnetic powder 41*a*) having a particle size larger than the thickness of the insulation coating layer 61. In case of using a material having a relatively low conductivity such as ferrite and the like as the first magnetic powder 41*a*, even if the first magnetic powder 41*a* enters into the insulation coating layer 61 of the wire 6*a*, a short circuit between the turns of the coil part 6 rarely occurs. Also, as the first magnetic powder 41*a* has the particle size as mentioned in above, the coil device 2 having a good inductance property can be obtained.

Second Embodiment

A coil device according to a second embodiment of the present invention differs only in the method of production, and the constitution is same as the aforementioned first embodiment. In below, parts which are same as the first embodiment will be omitted from explaining.

A method of producing the coil device according the second embodiment has a difference only in a method of forming the resin rich layer 40. That is, in the present embodiment, first the coil part 6 having the wire 6*a* wound in a coil form is prepared, then the whole body including the inside of the coil part 6 is covered by the core part 4 (element body), and the lead part 6*b* of the wire 6*a* is exposed from the outer face of the core part 4. Then, while maintaining this state, preliminary molding is performed to the core part 4. The core part 4 is preliminary molded by filling the mixture including the magnetic powder and the binder resin in the cavity of the mold and the whole body is compressed (heat pressured) while the coil part 6 is inserted in the cavity of the mold. The core part 4 is preliminary molded by applying a smaller pressure than main molding. As the magnetic powder, the magnetic powder 41 including the first magnetic powder 41*a* and the second magnetic powder 41*b* as shown in FIG. 4 is used.

Next, the core part 4 obtained by preliminary molding (preliminary molded article) is immersed in the resin liquid. As the resin liquid, the resin 42 constituting the resin rich layer 40 is used. Here, due to a capillary action, the resin liquid infiltrates into the core part 4 through a small space formed around the lead part 6*b* of the wire 6*a*, and the resin liquid reaches to the area around the coil part 6. As a result, the resin liquid adheres to the surface of the coil part 6 so to cover (surround) the area around the coil part, and the resin layer is formed to the surface of the coil part 6. The length of time for immersing the core part 4 in the resin liquid can be adjusted accordingly, thereby the resin layer having a thickness of 5 to 200 μm can be formed to the surface of the coil part 6.

Next, the core part 4 is performed with main molding. When the core part 4 is performed with main molding, the core part 4 is compressed (heat pressured) by applying a larger pressure than a pressure of preliminary molding. When the core part 4 is compressed, part of the magnetic powder in the metal mold enters into the resin layer formed to the surface of the coil part 6, and the resin layer including the magnetic powder is formed to the surface of the coil part 6. As mentioned in above, the magnetic powder is constituted by the magnetic powder 41 which constitutes the resin rich layer 40, and the resin layer is constituted by the resin 42 constituting the resin rich layer 40. Thus, as the magnetic powder in the mold enters into the resin layer formed to the surface of the coil part 6, the resin rich layer 40 including the magnetic powder 41 and the resin 42 is obtained (see FIG. 3A and FIG. 3B).

In the present embodiment, the resin liquid is filled not only to the area around the coil part 6 but also to the area around the lead part 6*b* of the wire 6*a*, hence the resin layer is also formed to the area around the lead part 6*b*. Hence, when the core part 4 is compressed (main molding), the magnetic powder in the mold also enters into the resin layer formed around the lead part 6*b*, and the resin rich layer 40 is formed. Note that, the resin rich layer 40 may be formed to other areas besides the area around the lead part 6*b*. According to the present embodiment, the coil device 2 as similar to the first embodiment is obtained, and the similar effects as the first embodiment are obtained.

Third Embodiment

A coil device according to the third embodiment of the present invention differs in the method of producing the coil device, and the constitution is same as the aforementioned first embodiment. In below, parts which are same as the first embodiment will be omitted from explaining.

Figure 5:
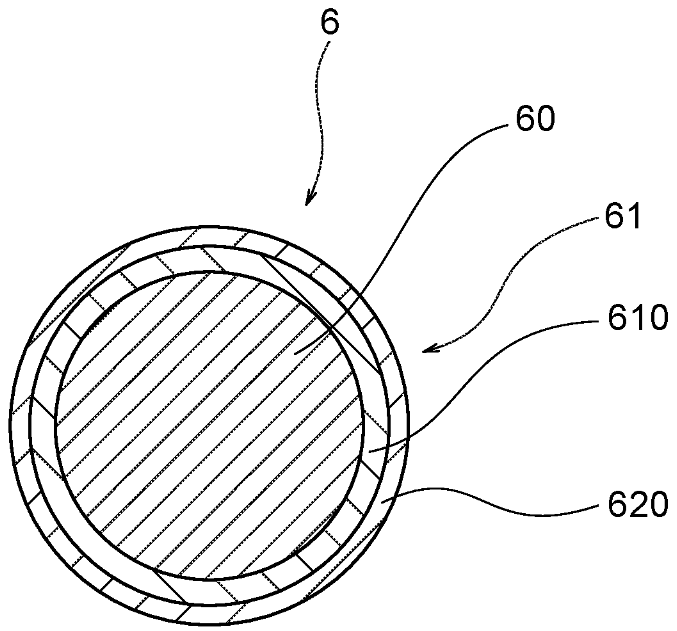
FIG. 5 is a bilateral cross section showing a constitution of a wire of a coil device according to the third embodiment of the present invention.
Figure 6:
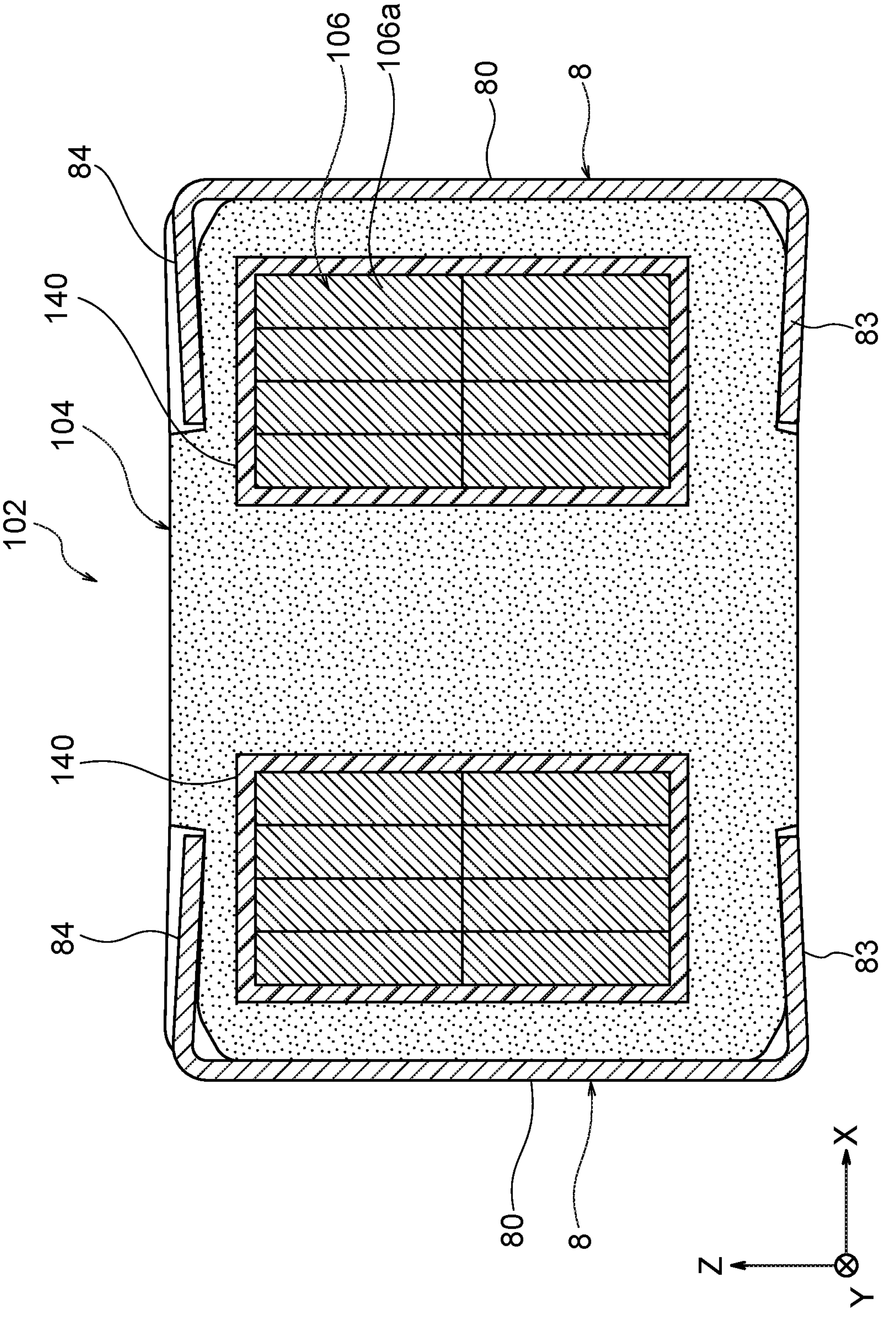
FIG. 6 is a cross section of the coil device according to fourth embodiment of the present invention.

In the present embodiment, a method of forming the resin rich layer 40 only differs. That is, in the present embodiment, as shown in FIG. 3A and FIG. 3B, first the coil part 6 having the wire 6*a* wound in a coil form is prepared. The coil part 6 is for example constituted by an air core coil. As shown in FIG. 5, the insulation coating layer 61 formed to the surface of the lead wire 60 includes a first insulation coating layer 610 and a second insulation coating layer 620. The first insulation coating layer 610 is formed to the surface of the lead wire 60, and the second insulation coating layer 620 is formed to the surface of the first insulation coating layer 610.

As a resin constituting the second insulation coating layer 620, a resin which melts easier than a resin used for the first insulation coating layer 610 is used. In the present embodiment, as the resin constituting the second insulation coating layer 620, the resin 42 constituting the resin rich layer 40 is used. For example, the first insulation coating layer 610 may be constituted by polyamideimide, and the second insulation coating layer 620 may be constituted by a material made by adding additives to polyamideimide.

In the present embodiment, for example the air core coil is heated during the step of forming the coil part 6, thereby the second insulation coating layer 620 is melted and the heat fusion layer (self-fusion layer) is formed. Thereby, the surface of the first insulation coating layer 610 is entirely covered by the heat fusion layer, and the adjacent turns of the coil part 6 are connected (adhered) as a one body via the heat fusion layer. Note that, as described below, when the resin is compressed (heat pressured) together with the magnetic powder in the mold under a heating atmosphere, the second insulation coating layer 620 may be melted and the heat fusion layer may be formed to the surface of the first insulation coating layer 610.

Next, the entire body including the inside of the coil part 6 is covered by the core part 4 (element body) and the lead part 6*b* of the wire 6*a* constituting the coil part 6 is exposed from the outer surface of the core part 4. The core part 4 is molded for example by filling a mixture including the magnetic powder and the binder resin into a cavity of a mold while the coil part 6 is inserted in the cavity of the mold, then compression is carried out to the entire body. As the magnetic powder, the magnetic powder 41 including the first magnetic powder 41*a* and the second magnetic powder 41*b* as shown in FIG. 4 is used.

When the resin is compressed (heat pressured) together with the magnetic powder in the mold under a heating atmosphere, part of the heat fusion layer formed to the surface of the first insulation coating layer 610 melts, and oozes out to the inside of the core part 4 positioned around the coil part 6. As a result, the area around the coil part 6 becomes resin rich for the amount which the heat fusion layer has melted. As mentioned in above, the magnetic powder is constituted by the magnetic powder 41 constituting the resin rich layer 40, and the heat fusion layer is constituted by the resin 42 constituting the resin rich layer 40. Hence, as the heat fusion layer formed to the surface of the first insulation coating layer 610 oozes out to the area around the coil part 6, the resin rich layer 40 including the magnetic powder 41 and the resin 42 is obtained (see FIG. 3A and FIG. 3B).

Note that, by adjusting the heating temperature during compression molding, the amount of the heat fusion layer oozing out to the inside of the core part 4 can be regulated, and the heat fusion layer having a thickness of 5 to 200 μm can be formed. Also, the amount of the resin 42 in the resin rich layer 40 can be regulated to a desired amount.

In the present embodiment, the coil device similar to the first embodiment is obtained, and similar effects as the first embodiment can be obtained. Particularly, in the present embodiment, the surface of the insulation coating layer 61 is formed with the heat fusion layer (the heat fusion layer formed from the second insulation coating layer 620). Therefore, the heat fusion layer can function as the resin rich layer 40, and when the resin 42 in the mold is compressed together with the magnetic powder 41, the magnetic powder 41 is prevented from entering into the insulation coating layer 61 of the wire 6*a* due to the heat fusion layer. Thus, in the present embodiment, a short circuit between the turns of the coil part 6 can be prevented.

Fourth Embodiment

The coil device 102 according to the fourth embodiment of the present invention differs only in the following points, and other constitutions are same as the aforementioned first embodiment. In the figure, the same members as the first embodiment are given the same numerical references, and detailed description of these will be omitted.

As shown in FIG. 8, the coil device 110 includes a coil part 106 and a resin rich layer 140. The coil part 106 has a wire 106*a*. The wire 106*a* differs from the wire 6*a* of the first embodiment from the point that the wire 106*a* is constituted by a rectangular wire.

The wire 106*a* is wound in a normalwise winding. Note that, a winding method of the wire 106*a* is not limited thereto, and for example it may be wound in an edgewise winding or a winding.

In the figures, Z axis direction of the coil part 106 (winding axis direction) is formed in two layers, however it is not particularly limited to two layers. Also, X axis direction and Y axis direction of the coil part 106 are formed in four layers respectively, but it is not particularly limited to four layers.

The resin rich layer 140 is formed around the coil part 106, and it covers around (surrounds) the coil part 106 formed by winding a rectangular wire.

The same effects as the first embodiment are obtained by the present embodiment. Particularly, in the present embodiment, the wire 106*a* is constituted by a rectangular wire. Thus, a space factor of the coil part 106 can be increased in the core part 4 (element body); and the coil device 102 having a good inductance property can be obtained. Also, a low resistance of the coil part 6 can be achieved.

Note that, the present invention is not limited to the above-embodiments, and various modifications can be performed within the scope of the present invention.

In the above-mentioned embodiments, the resin rich layer 40 may include the magnetic powder 41 (first magnetic powder 41*a*) having a particle size smaller than a thickness of the insulation coating layer 61 formed to the surface of the lead wire 60. As such, when the resin rich layer 40 includes the first magnetic powder 41*a* having a particle size smaller than a thickness of the insulation coating layer 61, as a material constituting the first magnetic powder 41*a*, a material with high conductivity (metal magnetic powder) may be used. By using the metal magnetic powder as the first magnetic powder 41*a*, the coil device 2 having a good inductance property can be obtained. Also, by having the particle size of the first magnetic powder 41*a* (metal magnetic powder) as mentioned in above, the first magnetic powder 41*a* can be effectively prevented from entering into the insulation coating layer 61 of the above-mentioned wire 6*a*.

In the above-mentioned embodiments, the resin rich layer 40 may be constituted (substantially) only by the resin 42. In such case, the magnetic powder 42 is not included around the coil part 6, thus the magnetic powder 41 can be effectively prevented from entering into the insulation coating layer 61 of the above-mentioned wire 6*a*.

In the above-mentioned embodiments, the resin rich layer 40 may be constituted only by the second magnetic powder 41*b* (small magnetic powder). In such case, the particle size of the second magnetic powder 41*b* is same as the thickness of the insulation coating layer 61, or preferably it may be smaller than the thickness of the insulation coating layer 61.

In the above-mentioned embodiments, the side faces 4*cl* and 4*cl* positioned opposite to each other as shown in FIG. 2 have same shapes and areas, but the shapes and the areas may be different. Same applies to the side faces 4*c*2 and 4*c*2.

In the above-mentioned embodiments, the coil part 6 has a circular coil shape, but it is not particularly limited thereto, and the shape may be a square coil shape, a polygonal coil shape, an oval coil shape, and other coil shapes. Further, the shape of the core part 4 is not particularly limited, and it may be a circular column shape, an oval column shape, a polygonal column shape, and the like.

In the present embodiment, the type of the magnetic powder 41 included in the resin rich layer 40 may be changed if needed.

NUMERICAL REFERENCES

2, 102 . . . . Coil device
4, 104 . . . . Core part
4*a* . . . . Mounting side outer face
4*a*1, 4*b*1 . . . . Installing groove
4*b* . . . . Non-mounting side outer face
4*c* . . . . Side face (lateral outer face)
4*c*1 . . . . Main installing side face
4*c*2 . . . . Sub installing side face
4*c*3*a*, 4*c*3*b*, 4*c*4*a*, 4*c*4*b* . . . . Non-installing side face
40, 140 . . . . Resin rich layer
41 . . . . Magnetic powder
41*a* . . . . First magnetic powder
41*b* . . . . Second magnetic powder
42 . . . . Resin
6, 106 . . . . Coil part
6*a*, 106*a* . . . . Wire
60 . . . . Lead wire
61 . . . . Insulation coating layer
610 . . . . First insulation coating layer
620 . . . . Second insulation coating layer (heat fusion layer)
6*b* . . . . Lead part
6*c* . . . . Bonding part
8 . . . . Terminal electrode
80 . . . . Main terminal body
82 . . . . Sub terminal body
83, 84 . . . . Resilient piece
85 . . . . Lead supporting part

What is claimed is:

1. A coil device comprising:

an element body including a magnetic powder and a resin, and a coil part embedded in the element body and having a wound wire around which an insulation coating layer is formed, wherein the element body includes a resin rich layer surrounding the insulation coating layer and an outer area with a smaller weight ratio of elements constituting the resin in comparison to the resin rich layer surrounding the resin rich layer, the resin rich layer is formed along a shape of an outer circumference of the coil part, and has a predetermined thickness on an outer surface of the insulation coating layer of the wire, a thickness of the resin rich layer is 50 to 150 μm, the insulation coating layer is located on the outer circumference of the coil part along the shape of the outer circumference of the coil part, and the outer area extends along the shape of the outer circumference of the coil part so as to surround the outer circumference of the coil part, the magnetic powder includes a first magnetic powder and a second magnetic powder having a smaller particle size than a particle size of the first magnetic powder, the resin rich layer includes the first magnetic powder and the second magnetic powder, a particle size of the first magnetic powder is 20 to 50 μm, a particle size of the second magnetic powder is 5 to 10 μm, an amount of the second magnetic powder is larger than an amount of the first magnetic powder at a position close to the coil part in the resin rich layer, and in the resin rich layer, the amount of the second magnetic powder increases at a position closer to the coil part and the amount of the first magnetic powder increases at a position away from the coil part.

2. The coil device according to claim 1, wherein a heat fusion layer is formed at a surface of the insulation coating layer.

3. The coil device according to claim 1, wherein the magnetic powder included in the resin rich layer is composed of a soft magnetic metal.

4. The coil device according to claim 1, wherein the resin rich layer includes the magnetic powder having a particle size larger than a thickness of the insulation coating layer.

5. The coil device according to claim 2, wherein the resin rich layer includes the magnetic powder having a particle size larger than a thickness of the insulation coating layer.

6. The coil device according to claim 1, wherein the magnetic powder included in the resin rich layer is a metal magnetic powder, and the resin rich layer includes the metal magnetic powder having a particle size smaller than a thickness of the insulation coating layer.

7. The coil device according to claim 2, wherein the magnetic powder included in the resin rich layer is a metal magnetic powder, and the resin rich layer includes the metal magnetic powder having a particle size smaller than a thickness of the insulation coating layer.

8. The coil device according to claim 1, wherein the wire is a rectangular wire.

9. The coil device according to claim 1, wherein an interface between the resin rich layer and the outer area extends along the shape of the outer circumference of the coil part so as to surround the outer circumference of the coil part.

* * * * *